(12) United States Patent
Kumar

(10) Patent No.: US 7,618,478 B2
(45) Date of Patent: Nov. 17, 2009

(54) PROCESS AND APPARATUS TO RECOVER MEDIUM PURITY CARBON DIOXIDE

(75) Inventor: Ravi Kumar, Williamsville, NY (US)

(73) Assignee: Praxair Technology, Inc., Danbury, CT (US)

(*) Notice: Subject to any disclaimer, the term of this patent is extended or adjusted under 35 U.S.C. 154(b) by 576 days.

(21) Appl. No.: 11/395,139

(22) Filed: Apr. 3, 2006

(65) Prior Publication Data

US 2007/0227353 A1 Oct. 4, 2007

(51) Int. Cl.
*B01D 53/02* (2006.01)
(52) U.S. Cl. ............................. 95/100; 95/103; 95/139; 95/148
(58) Field of Classification Search ..................... 95/96, 95/100, 103, 139, 148; 96/121, 130
See application file for complete search history.

(56) References Cited

U.S. PATENT DOCUMENTS

| | | | |
|---|---|---|---|
| 4,171,206 A | 10/1979 | Sircar | |
| 4,299,596 A | 11/1981 | Benkmann | |
| 4,770,676 A | 9/1988 | Sircar et al. | |
| 4,790,858 A * | 12/1988 | Sircar | 95/101 |
| 4,840,647 A | 6/1989 | Hay | |
| 4,857,083 A | 8/1989 | DiMartino | |
| 4,913,709 A | 4/1990 | Kumar | |
| 5,026,406 A | 6/1991 | Kumar | |
| 5,051,115 A | 9/1991 | Leitgeb et al. | |
| 5,248,322 A | 9/1993 | Kumar | |
| 5,294,247 A | 3/1994 | Scharpf et al. | |
| 5,354,346 A | 10/1994 | Kumar | |
| 6,245,127 B1 | 6/2001 | Kane et al. | |
| 2007/0227352 A1* | 10/2007 | Kumar | 95/96 |
| 2007/0261551 A1* | 11/2007 | Sawada et al. | 95/100 |

FOREIGN PATENT DOCUMENTS

| EP | 0 620 035 A1 | 10/1994 |
|---|---|---|
| GB | 2 155 805 A | 10/1985 |

OTHER PUBLICATIONS

Takamura et al., "Evaluation of Dual-Bed Pressure Swing Adsorption for CO2 Recovery from Boiler Exhaust Gas", Separation & Purification Tech. (2001), pp. 519-528.
Chou et al., "CO2 Recovery by Vacuum Swing Adsorption", Separation and Purification Technology (2004), pp. 51-56.

(Continued)

*Primary Examiner*—Robert A Hopkins
(74) *Attorney, Agent, or Firm*—Salvatore P. Pace

(57) ABSTRACT

The present invention generally relates to vacuum pressure swing adsorption (VPSA) processes and apparatus to recover carbon dioxide having a purity of approximately $\geq 80$ mole percent from streams containing at least carbon dioxide and hydrogen (e.g., syngas). The feed to the $CO_2$ VPSA can be at super ambient pressure. The $CO_2$ VPSA unit produces two streams, a $H_2$-enriched stream and a $CO_2$ product stream. The process cycle steps are selected such that there is minimal or no hydrogen losses from the process. The recovered $CO_2$ can be further upgraded, sequestered or used in applications such as enhanced oil recovery (EOR).

101 Claims, 12 Drawing Sheets

OTHER PUBLICATIONS

Reynolds et al., "New Pressure Swing Adsorption Cycles for CO2 Sequestration", Adsorption (2005), pp. 531-536.

Siriwardane et al., "Optimization of Pressure Swing Adsorption and Fractionated Vacuum Pressure Swing Adsorption Processes for CO2 Capture", I&EC Res. (2005), pp. 8084-8094.

Zhang et al., "Experimental Pilot-Scale Study of CO2 Recovery from Flue Gas Streams by Vacuum Swing Adsorption", AIChE Mtg. (2005).

Xiao et al., "Recovery of CO2 from Flue Gas Streams by Vacuum Swing Adsorption", AIChE Mtg. (2005).

* cited by examiner $CO_2$ VPSA - 6 Beds, 3 Pressure Equalizations and Flow through the Evacuating bed Figure 4
Valve Sequence
$CO_2$ VPSA - 6 Beds, 3 Pressure Equalizations and Flow through the Evacuating bed

| Step # | Time From | Time To | Duration | BED A1 | BED A2 | BED A3 | BED A4 | BED A5 | BED A6 |
|---|---|---|---|---|---|---|---|---|---|
| 1 | 0 | 30 | 30 | Feed | PE1 | PE3 | Evac. | DP3 | DP1 |
| 2 | 30 | 60 | 30 | Feed | PE1 | PE3 | Evac. | DP3 | DP1 |
| 3 | 60 | 90 | 30 | Feed | FeRP | PE2 | Evac. | DPf | DP2 |
| 4 | 90 | 120 | 30 | Feed | FeRP | PE2 | Evac. | DPf | DP2 |
| 5 | 120 | 150 | 30 | DP1 | Feed | PE1 | PE3 | Evac. | DP3 |
| 6 | 150 | 180 | 30 | DP1 | Feed | PE1 | PE3 | Evac. | DP3 |
| 7 | 180 | 210 | 30 | DP2 | Feed | FeRP | PE2 | Evac. | DPf |
| 8 | 210 | 240 | 30 | DP2 | Feed | FeRP | PE2 | Evac. | DPf |
| 9 | 240 | 270 | 30 | DP3 | DP1 | Feed | PE1 | PE3 | Evac. |
| 10 | 270 | 300 | 30 | DP3 | DP1 | Feed | PE1 | PE3 | Evac. |
| 11 | 300 | 330 | 30 | DPf | DP2 | Feed | FeRP | PE2 | Evac. |
| 12 | 330 | 360 | 30 | DPf | DP2 | Feed | FeRP | PE2 | Evac. |
| 13 | 360 | 390 | 30 | Evac. | DP3 | DP1 | Feed | PE1 | PE3 |
| 14 | 390 | 420 | 30 | Evac. | DP3 | DP1 | Feed | PE1 | PE3 |
| 15 | 420 | 450 | 30 | Evac. | DPf | DP2 | Feed | FeRP | PE2 |
| 16 | 450 | 480 | 30 | Evac. | DPf | DP2 | Feed | FeRP | PE2 |
| 17 | 480 | 510 | 30 | PE3 | Evac. | DP3 | DP1 | Feed | PE1 |
| 18 | 510 | 540 | 30 | PE3 | Evac. | DP3 | DP1 | Feed | PE1 |
| 19 | 540 | 570 | 30 | PE2 | Evac. | DPf | DP2 | Feed | FeRP |
| 20 | 570 | 600 | 30 | PE2 | Evac. | DPf | DP2 | Feed | FeRP |
| 21 | 600 | 630 | 30 | PE1 | PE3 | Evac. | DP3 | DP1 | Feed |
| 22 | 630 | 660 | 30 | PE1 | PE3 | Evac. | DP3 | DP1 | Feed |
| 23 | 660 | 690 | 30 | FeRP | PE2 | Evac. | DPf | DP2 | Feed |
| 24 | 690 | 720 | 30 | FeRP | PE2 | Evac. | DPf | DP2 | Feed |

Valve groups: FEED In (101–106), Feed Out/FeRP (401–406), Evacuation (301–306), CoC DP/PE 1&2 (501–506), DPf and PE3 (601–606).

Legend:
"Blank" — Valve Closed
o — Valve fully open
ⴲ — Valve with Positioner

Figure 5

CO$_2$ VPSA - 5 Beds, 2 Pressure Equalizations and Flow through the Evacuating bed

| Bed | | | | | | | | | | |
|---|---|---|---|---|---|---|---|---|---|---|
| 1 | Feed | | DP1 | DP2 | DPf | Evacuation | | PE2 | PE1 | FeRP |
| 2 | PE1 | FeRP | Feed | | | DP1 | DP2 | DPf | Evacuation | PE2 |
| 3 | Evacuation | | PE2 | PE1 | FeRP | Feed | | | DP1 | DP2 | Evacu |
| 4 | DPf | Evacuation | | DP2 | PE2 | FeRP | | PE1 | DPf | DP2 |
| 5 | DP1 | DP2 | DPf | Evacuation | | PE2 | PE1 | FeRP | Feed | |

| Step | Description | Typical Step Time |
|---|---|---|
| Feed | Feed to CO$_2$ VPSA ---> Product as feed to H$_2$ PSA | 2 min |
| DP1 | CoC DP1 to PE1 with an A bed | 1 min |
| DP2 | CoC DP2 to PE2 with another of the A bed | 1 min |
| DPf | Final Depressurisation to provide purge to another bed on evacuation or produce part of the product to be mixed with the evacuated product | 1 min |
| Evac. | CcC Evac to collect CO$_2$ product | 2 min |
| PE2 | CCC PE2 with an A Bed on DP2 to increase H$_2$/CO$_2$ recovery | 1 min |
| PE1 | CCC PE1 with an A bed on DP1 to increase H$_2$/CO$_2$ recovery | 1 min |
| FeRP | CcC RP by Feed Effluent | 1 min |

CO₂ VPSA - 6 Beds, 3 Pressure Equalizations and Direct Mixing

Figure 9
Valve Sequence
CO₂ VPSA - 6 Beds, 3 Pressure Equalizations and Direct Mixing

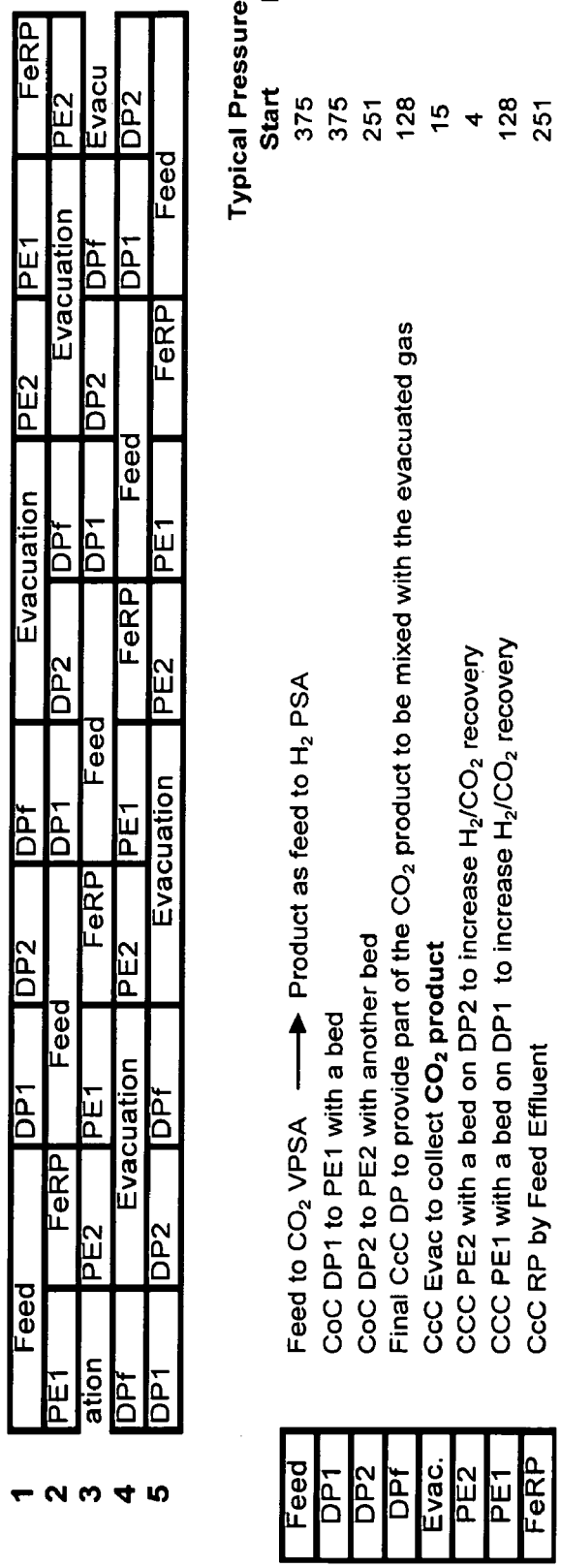

Figure 11

**CO$_2$ VPSA - 8 Beds, 2 Pressure Equalizations and Direct Mixing
2 Beds on Feed, 3 beds on Evacuation**

| | | | | | | | | | | | | | | | |
|---|---|---|---|---|---|---|---|---|---|---|---|---|---|---|---|
| A1 | FEED | | DP1 | DP2 | DPf | Evacuation | | | PE2 | PE1 | RP |
| A2 | PE1 | RP | FEED | | | DP1 | DP2 | DPf | Evacuation | | | PE2 |
| A3 | Evc. | PE2 | PE1 | RP | FEED | | | DP1 | DP2 | DPf | Evacuation | |
| A4 | Evacuation | | | PE2 | PE1 | RP | FEED | | | DP1 | DP2 | Evac |
| A5 | DPf | Evacuation | | | | PE2 | PE1 | RP | FEED | | | DP1 | DP2 |
| A6 | DP1 | DP2 | DPf | Evacuation | | | | PE2 | PE1 | RP | FEED | | |
| A7 | FEED | | DP1 | DP2 | DPf | Evacuation | | | | PE2 | PE1 | RP |
| A8 | FEED | | | DP1 | DP2 | DPf | Evacuation | | | | PE2 | PE1 | RP | FEED |

Feed to CO$_2$ VPSA ---> Product as feed to H$_2$ PSA
CoC DP1 to PE1 with a bed
CoC DP2 to PE2 with another bed
Final Depressurisation to provide part of the product to be mixed with the evacuated product
CcC Evac to collect CO$_2$ product
CCC PE2 with a Bed on DP2 to increase H$_2$/CO$_2$ recovery
CCC PE1 with aonther bed on DP1 to increase H$_2$/CO$_2$ recovery
CoC Repressurization by Feed or CcC RP by Feed Effluent

| |
|---|
| Feed |
| DP1 |
| DP2 |
| DPf |
| Evac. |
| PE2 |
| PE1 |
| FRP |

Figure 12

CO₂ VPSA - 11 Beds, 2 Pressure Equalizations and Direct Mixing
3 Beds on Feed, 2 Beds on Evacuation

| | | | | | | | | | | |
|---|---|---|---|---|---|---|---|---|---|---|
| A1 | FEED | FEED | FEED | DP1 | DP2 | DPf | Evacuation | Evacuation | PE2 | PE1 | RP |
| A2 | RP | FEED | FEED | FEED | DP1 | DP2 | DPf | Evacuation | Evacuation | PE2 | PE1 |
| A3 | PE1 | RP | FEED | FEED | FEED | DP1 | DP2 | DPf | Evacuation | Evacuation | PE2 |
| A4 | PE2 | PE1 | RP | FEED | FEED | FEED | DP1 | DP2 | DPf | Evacuation | Evacuation |
| A5 | Evac | PE2 | PE1 | RP | FEED | FEED | FEED | DP1 | DP2 | DPf | Evacuation |
| A6 | Evacuation | Evac | PE2 | PE1 | RP | FEED | FEED | FEED | DP1 | DP2 | DPf |
| A7 | DPf | Evacuation | Evac | PE2 | PE1 | RP | FEED | FEED | FEED | DP1 | DP2 |
| A8 | DP2 | DPf | Evacuation | Evac | PE2 | PE1 | RP | FEED | FEED | FEED | DP1 |
| A9 | DP1 | DP2 | DPf | Evacuation | Evac | PE2 | PE1 | RP | FEED | FEED | FEED |
| A10 | FEED | DP1 | DP2 | DPf | Evacuation | Evac | PE2 | PE1 | RP | FEED | FEED |
| A11 | FEED | FEED | DP1 | DP2 | DPf | Evacuation | Evac | PE2 | PE1 | RP | FEED |

Feed to CO₂ VPSA ---> Product as feed to H₂ PSA
CoC DP1 to PE1 with a bed
CoC DP2 to PE2 with another bed
Final Depressurisation to provide part of the product to be mixed with the evacuated product
CcC Evac to collect CO₂ product
CCC PE2 with a Bed on DP2 to increase H₂/CO₂ recovery
CCC PE1 with aonther bed on DP1 to increase H₂/CO₂ recovery
CoC Repressurization by Feed or CcC RP by Feed Effluent

| Feed |
|---|
| DP1 |
| DP2 |
| DPf |
| Evac |
| PE2 |
| PE1 |
| FRP |

PROCESS AND APPARATUS TO RECOVER MEDIUM PURITY CARBON DIOXIDE

TECHNICAL FIELD

The present invention generally relates to vacuum pressure swing adsorption (VPSA) processes and apparatus to recover carbon dioxide having a purity of approximately $\geq 80$ mole percent from streams containing at least carbon dioxide and hydrogen (e.g., syngas). The feed to the $CO_2$ VPSA can be at super ambient pressure. The $CO_2$ VPSA unit produces two streams, a $H_2$-enriched stream and a $CO_2$ product stream. The process cycle steps are selected such that there is minimal or no hydrogen losses from the process and without requiring additional processing equipment. The recovered $CO_2$ can be further upgraded, sequestered or used in applications such as enhanced oil recovery (EOR).

BACKGROUND OF THE INVENTION

Steam methane reforming (SMR) is the primary process to produce hydrogen ($H_2$) in bulk quantities. After catalytic conversion of natural gas, carbon monoxide and hydrogen is produced as follows in equation (1):

$$CH_4 + H_2O \Leftrightarrow CO + 3H_2. \qquad (1)$$

The gas mixture is shifted (by a water-gas shift reaction) to further produce $H_2$ according to equation (2):

$$CO + H_2O \Leftrightarrow CO_2 + H_2. \qquad (2)$$

After the water-gas shift reaction, typical product gas has a pressure of between about 100-500 psia, a temperature of between about 60-150° F., and a composition of 60-80 mole percent $H_2$, 15-25 mole percent $CO_2$, 0.1-5 mole percent CO, 3-7 mole percent $CH_4$, 0-5 mole percent $N_2$ and is saturated with water. This gas mixture can then be fed to a pressure swing adsorption (PSA) unit to produce high purity $H_2$ (e.g., hydrogen at a purity of at least 99%).

In some current $H_2$ production plants, an amine unit is placed between the shift reactor and the $H_2$ PSA unit to extract $CO_2$ from the stream produced by the shift reactor. This process, however, is energy intensive. In addition, amine units can be difficult to operate and are known to have operational problems, such as corrosion, loss of fluid and the like.

U.S. Pat. No. 4,171,206 relates to production of high purity $CO_2$ (99.99+%) and high purity $H_2$ (99.99+%) at high $CO_2$ (99.9+%) recovery from SMR off-gas. This patent discloses two trains of adsorption beds, which are in communication with each other during the feed and re-pressurization steps. Beds in the $CO_2$ train employ a rinse step by high purity $CO_2$ at high pressure. Depressurization and evacuation of the same bed follow this step. Depressurized gas is re-compressed and used for high-pressure rinse. The effluent from the high pressure, high purity rinse step is recycled to the feed.

U.S. Pat. No. 4,299,596 relates to production of two products at high purity by employing two trains of beds, which are integrated during the feed and co-current depressurization steps. The train producing the more strongly adsorbed species is purged by the co-current depressurized gas after it has been recompressed. Part of the co-current depressurized gas may be recycled for re-pressurization. Evacuation and blowdown steps produce part of the more strongly adsorbed species and part of the purge gas.

U.S. Pat. No. 4,770,676 relates to the production of methane and carbon dioxide from landfill gas. It is an integrated thermal (TSA) and pressure swing adsorption (PSA) process. The waste produced from the PSA regenerates the TSA.

U.S. Pat. No. 4,840,647 relates to production of $\geq 95\%$ carbon dioxide from a feed stream containing 10-30% $CO_2$ at ambient pressure. The process steps are feed, co-current evacuation, countercurrent evacuation to produce product and a repressurization step. Co-current evacuated gas is used for pressure equalizations/repressurization and mixed with the feed.

U.S. Pat. No. 4,857,083 considers production of carbon dioxide from a gas mixture. At the end of the feed step, the discharge end of the feed column is connected with the inlet end of the evacuated bed to reduce the pressure in this bed. $CO_2$ is then produced by evacuation. This is followed by pressure build up steps.

U.S. Pat. No. 4,913,709 relates to the production of two products at high purity. The reference suggests the use of two trains of beds, which are integrated during the feed and re-pressurization steps. The train producing the more strongly adsorbed species is purged by the more strongly adsorbed species obtained during the evacuation step. This purge is at low pressure and is carried out after the bed has been depressurized. Effluent during the purge step is recompressed and recycled as feed.

U.S. Pat. No. 4,915,711 discloses production of two products at high purity using a single train of beds. The bed is purged by the more strongly adsorbed species obtained during the evacuation step. This purge is at low pressure and is carried out after the bed has been depressurized. Effluent during the purge step and depressurization step is recompressed and recycled as feed.

U.S. Pat. No. 5,026,406 discloses the production of two products at high purity by employing a single train of beds. The bed is purged by the more strongly adsorbed species obtained during the evacuation step. This purge is at low pressure and is carried out after the bed has been depressurized. Effluent during the purge step and depressurization step is recompressed and recycled as feed.

U.S. Pat. No. 5,051,115 produces a more strongly adsorbed species from a gas mixture at high purity. A co-current purge step is employed by the high purity strongly adsorbed species. This purge stream and product are obtained during the evacuation step. Effluent from the purge step is recycled for repressurization.

U.S. Pat. No. 5,248,322 relates to a process with four steps: adsorption, depressurization, evacuation and pressure equalization by part of the depressurized gas and repressurization. The first part (higher pressure) of the depressurized gas is recycled whereas the second part (lower pressure) is used for pressure equalization.

U.S. Pat. No. 5,354,346 relates to a process with five steps: adsorption, depressurization, low pressure co-current purge, evacuation and pressure equalization by part of the depressurized and low pressure purge effluent gas and repressurization. The first part (higher pressure) of the depressurized gas is recycled whereas the second part (lower pressure) and part of the low pressure purge effluent gas is used for pressure equalization.

U.S. Pat. No. 6,245,127 discusses production of $CO_2$ from a low-pressure gas mixture at constant purity. It employs simultaneous purge and evacuation steps. The countercurrent purge is carried out by the less strongly adsorbed species.

It would be desirable to provide economically beneficial processes and apparatus for $CO_2$ recovery. It would further be desirable for such processes and apparatus to be more efficient and easier to use relative to the prior art.

SUMMARY OF THE INVENTION

The present invention generally relates to vacuum pressure swing adsorption (VPSA) processes and apparatus to recover carbon dioxide having a purity of approximately ≧80 mole percent from streams containing at least carbon dioxide and hydrogen (e.g., syngas). The feed to the $CO_2$ VPSA can be at super ambient pressure. The $CO_2$ VPSA unit produces two streams, a $H_2$-enriched stream and a $CO_2$ product stream. The process cycle steps are selected such that there is minimal or no hydrogen losses from the process and without requiring additional processing equipment. $CO_2$ produced in accordance with the present invention may be used for any desired purpose. For example and while not to be construed as limiting, $CO_2$ produced as described herein can be used for liquefaction to produce food-grade quality product(s), supercritical $CO_2$ for enhanced oil recovery or simply $CO_2$ for sequestration to avoid addition of green house gases in the atmosphere to meet regulatory requirements. The present invention utilizes depressurizations of an adsorbent from high pressure to low pressure to increase $CO_2$ concentration in the bed(s). After $CO_2$ concentration is increased, $CO_2$ product is produced by further pressure reduction. This can be accomplished because of the recognition that for some adsorbents, depressurization from high to low pressure increases $CO_2$ concentration in the adsorbent bed(s). Consequently, the need for rinse, purge and/or recycle steps as used in the prior art can be eliminated. This in turn allows for the elimination of certain pieces of rotating machines (e.g., rinse compressor, purge compressor, recycle compressor) and associated power requirements, thereby providing a process and apparatus which is simpler to operate and more economical than prior art systems. The proposed processes do not require steam and thus are expected to reduce the cost of $CO_2$ separation.

To increase $CO_2$ recovery and minimize or eliminate $H_2$ losses, the present invention uses the depressurized gas to build up or increase the pressure in low-pressure beds. The bed depressurization therefore increases $CO_2$ concentration in the product and by equalizing with other beds in the unit, at the same time, increases $CO_2$ recovery and minimizes or eliminates $H_2$ loss.

Another significant feature of the process is that the final depressurized gas (step number 5 (DPf) of FIG. 2, 6, or 7 or step 4 (DPf) of FIGS. 5, 10, 11 or 12) is not wasted. Rather, this gas stream, which is now $CO_2$ rich, can be used in either of the two ways or in combination thereof. First, the final depressurized gas stream can be mixed with $CO_2$ produced during the evacuation step. In this embodiment, the mixed gas constitutes the $CO_2$ product. In the alternative or in addition, part or the entire final depressurized gas stream can be passed through the bed which is under evacuation. In this embodiment, the evacuated gas constitutes the $CO_2$ product. In this manner, $H_2$ loss from $CO_2$ VPSA is expected to be minimized or entirely eliminated.

Another feature of the present invention is that by reducing $CO_2$ in the feed stream to the $H_2$ PSA unit, $H_2$ recovery from the $H_2$ PSA unit is expected to increase.

In preferred embodiments in which the $CO_2$ VPSA apparatus is installed between an steam methane reformer (SMR)/shift reactor and a $H_2$ PSA unit, the amount of $CO_2$ in the feed stream to the $H_2$ PSA unit is reduced, thereby allowing for increased recovery of $H_2$ from the $H_2$ PSA unit. In other embodiments of the present invention, a feed stream can be provided by a partial oxidation reactor or the like. In any of these embodiments, the feed stream to the $CO_2$ VPSA unit will be a stream containing at least hydrogen and carbon dioxide at high pressure (for example, 100-500 psia). By eliminating the hardware (i.e. rotating machinery) as mentioned hereinabove, and corresponding power requirements, the present invention is expected to more efficiently produce $CO_2$ from synas or other streams containing at least carbon dioxide and hydrogen relative to the prior art.

BRIEF DESCRIPTION OF THE DRAWINGS

For a more complete understanding of the present invention and the advantages thereof, reference should be made to the following Detailed Description taken in conjunction with the accompanying drawings in which:

FIG. 4 shows the valve sequence for operation of the $CO_2$ VPSA unit shown in FIGS. 2 and 3;

FIG. 5 illustrates an alternative cycle step chart for a $CO_2$ VPSA unit having five beds, two pressure equalization steps and flow through the evacuating bed in accordance with the present invention;

FIG. 9 shows the valve sequence for operation of the $CO_2$ VPSA unit shown in FIGS. 7 and 8;

FIG. 10 illustrates yet another cycle step chart for a $CO_2$ VPSA unit having five beds, two pressure equalization steps and direct mixing according to the present invention;

FIG. 11 illustrates yet another cycle step chart for a $CO_2$ VPSA unit having eight beds, two pressure equalization steps and direct mixing in which two beds are continuously on feed and at least two beds are continuously under evacuation according to the present invention; and FIG. 12 illustrates a further cycle step chart for a $CO_2$ VPSA unit having eleven beds, two pressure equalization steps and direct mixing in which three beds are continuously on feed and two beds are continuously under evacuation according to the present invention.

DETAILED DESCRIPTION

As discussed hereinabove, the present invention generally relates to vacuum pressure swing adsorption (VPSA) processes and apparatus to recover carbon dioxide having a purity of approximately ≧80 mole percent from streams containing at least carbon dioxide and hydrogen (e.g., syngas). The feed to the $CO_2$ VPSA can be at super ambient pressure. The $CO_2$ VPSA unit produces two streams, a $H_2$-enriched stream and a $CO_2$ product stream.

$CO_2$ produced in accordance with the present invention may be used for any desired purpose. For example and while not to be construed as limiting, $CO_2$ produced as described herein can be used for liquefaction to produce food-grade quality product(s), supercritical $CO_2$ for enhanced oil recovery or simply $CO_2$ for sequestration to avoid additional green house gases in the atmosphere in order to satisfy regulatory requirements.

Figure 2:
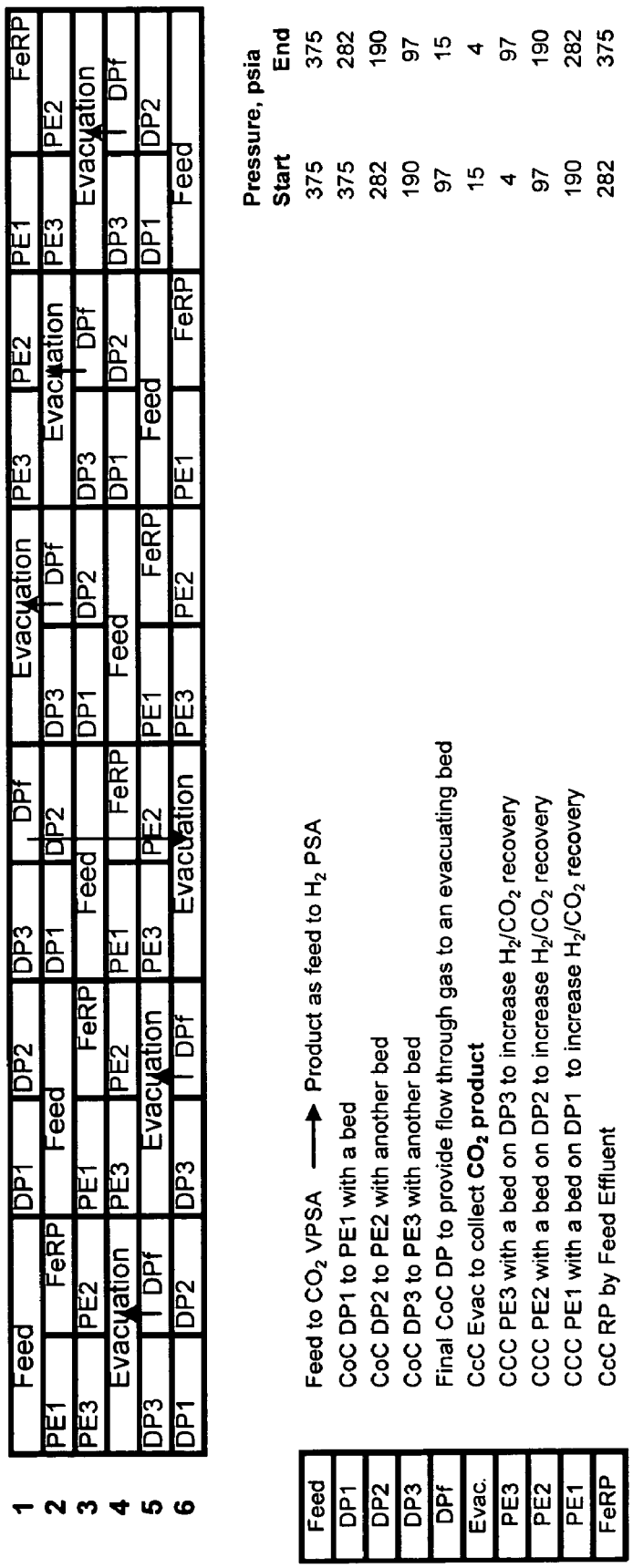
FIG. 2 illustrates a cycle step chart for $CO_2$ VPSA unit having six beds, three pressure equalization steps and flow through the evacuating bed in accordance with one embodiment of the present invention.
Figure 6:
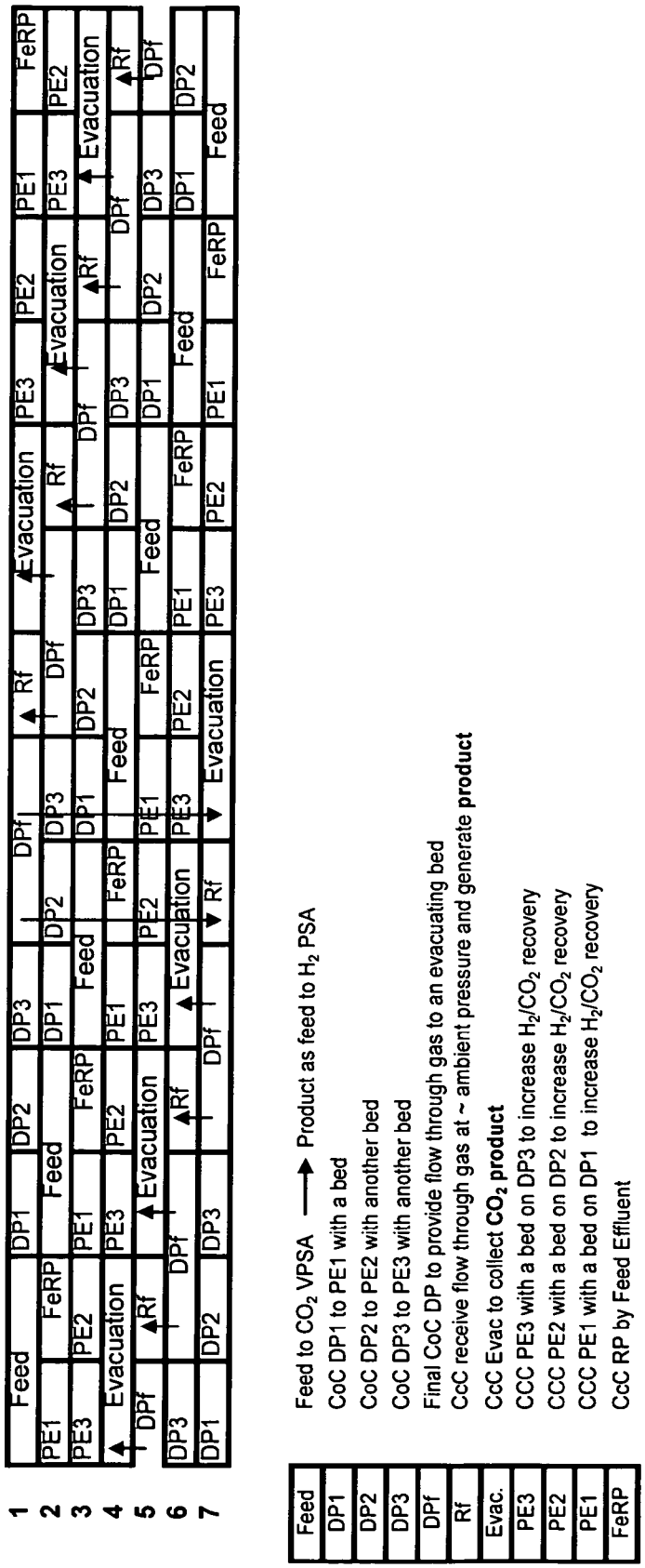
FIG. 6 illustrates another alternative cycle step chart for a $CO_2$ VPSA unit having seven beds, three pressure equalization steps and flow through the evacuating bed in accordance with the present invention.
Figure 7:
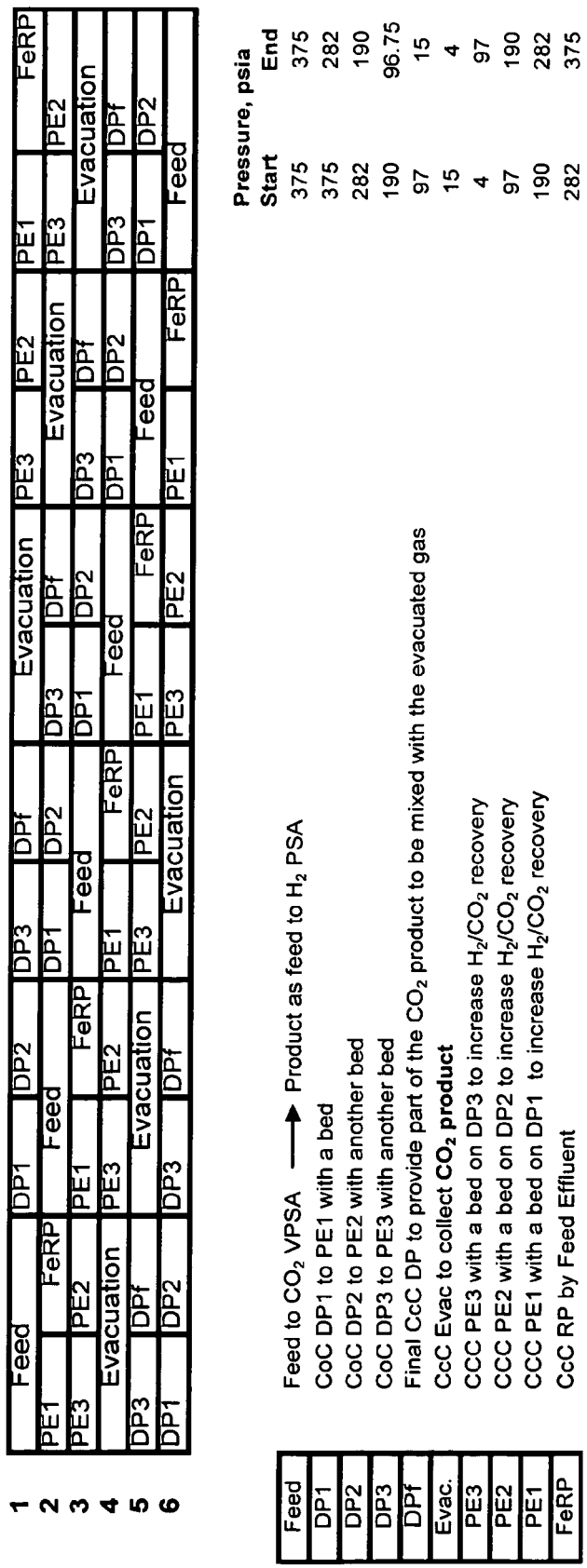
FIG. 7 illustrates a further cycle step for a $CO_2$ VPSA unit having six beds, three pressure equalization steps and direct mixing in accordance with another embodiment of the present invention.

As discussed in more detail herein, a significant feature of the processes is that the final depressurized gas (step number 5 (DPf) of FIG. 2, 6, or 7 or step 4 (DPf) of FIGS. 5, 10, 11 or 12) is not wasted. Rather, this gas stream (which is now $CO_2$-rich) can be used in either of two ways or in combination thereof. First, the final depressurized gas stream can be mixed with $CO_2$ produced by another bed under evacuation. In this embodiment, the mixed gas constitutes the $CO_2$ product. In the alternative or in addition, part or the entire final depressurized gas stream can be passed through the bed which is under evacuation. In this embodiment, the evacuated gas constitutes at least a part of the $CO_2$ product. In this manner, $H_2$ loss from $CO_2$ VPSA is expected to be minimized or entirely eliminated.

Figure 1:
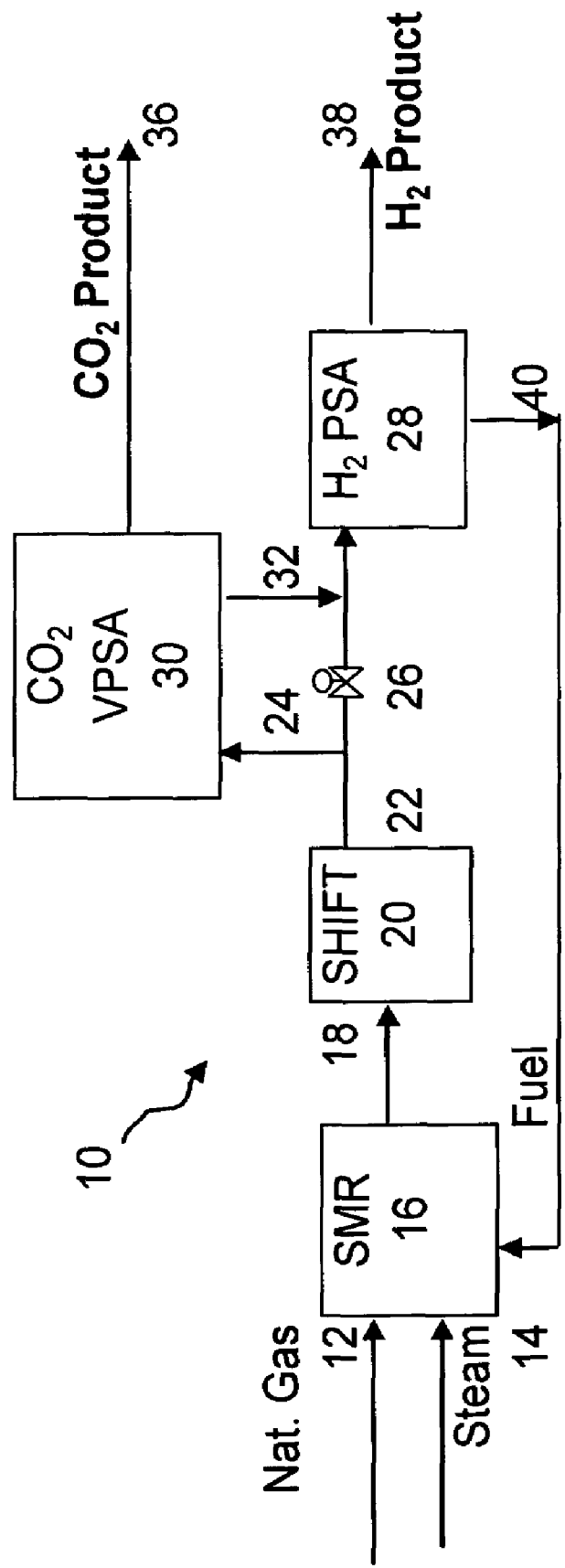
FIG. 1 illustrates an embodiment in accordance with the present invention in which a $CO_2$ VPSA unit is positioned upstream of a $H_2$ PSA unit.

In a preferred embodiment of the present invention and as illustrated in FIG. 1, system 10 includes $CO_2$ VPSA unit 30 positioned upstream of $H_2$ PSA unit 28. As discussed above, natural gas 12 and steam 14 can be reformed in steam methane reformer 16 to produce stream 18, as outlined in equation (1) hereinabove. Stream 18 is then fed to shift reactor 20 to produce stream 22 as outlined in equation (2), as also set forth above. Stream 22 can be fed to $CO_2$ VPSA unit 30 via stream 24. Valve 26 will therefore typically be in the closed position and is in the open position when the $CO_2$ VPSA unit is not being used. Those skilled in the art will appreciate that valve 26 may alternatively be in the partially open position depending on the desired process capacity (i.e., $CO_2$ recovery).

When the arrangement shown in FIG. 1 is used with processes and apparatus in accordance with the present invention, $CO_2$-rich stream 36 (e.g. $\geq 80$ mole %) can be produced, together with hydrogen-rich feed 32 that is expected to result in higher hydrogen recovery 38 from $H_2$ PSA unit 28. Hydrogen PSA unit 28 can also produce fuel 40 for use in plant 10.

The present invention recognizes that depressurizations of a $CO_2$-selective adsorbent layer increases the $CO_2$ concentration in the adsorbent bed(s). More specifically, the present invention recognizes and utilizes depressurizations of an adsorbent from high pressure (e.g., 100-500 psia) to low pressure(s) (i.e., close to ambient and/or subambient pressures) to increase $CO_2$ concentration in the bed.

As used herein, a "feed stream" being fed to a $CO_2$ unit in accordance with the present invention is a stream containing at least hydrogen and carbon dioxide at a pressure between about 100-500 psia (e.g., 375 psia). After the $CO_2$ concentration is increased by multiple depressurizations, it can be used to produce the $CO_2$ product by further pressure reduction. For some adsorbents, depressurization from high to low pressure increases $CO_2$ concentration in the adsorbent bed. This step in the process can be used to eliminate several process steps as described in the prior art. Consequently, several pieces of rotating machinery (e.g., rinse compressor, purge compressor, recycle compressor) and associated power requirements can be eliminated, thus providing a process and system that enhances operation and improves efficiency.

Figure 3:
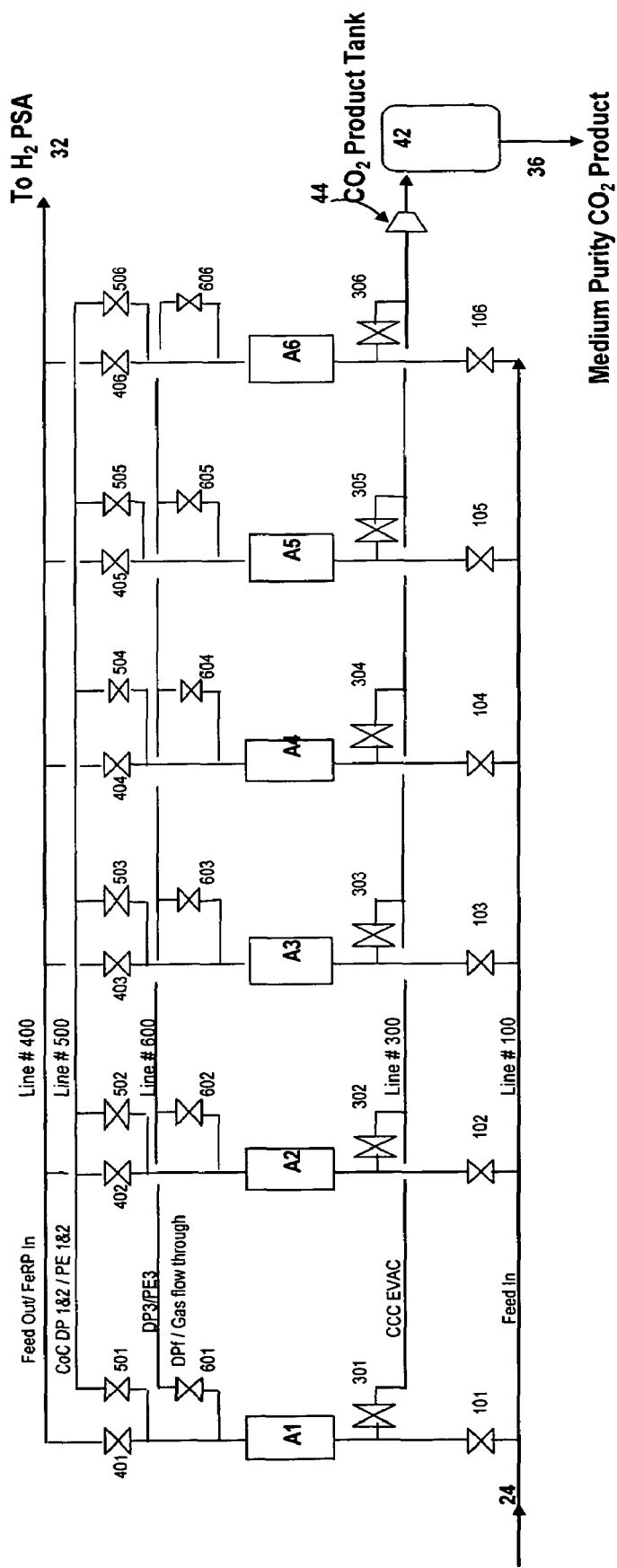
FIG. 3 shows a schematic drawing for $CO_2$ VPSA unit of FIG. 2.

As mentioned above, the $CO_2$ VPSA processes and apparatus of the present invention can be used to produce $CO_2$ having a purity of about 80 mole percent from a feed gas such as a syngas. In one embodiment of the present invention, the processes provide for flow through the evacuating bed (see for example, FIGS. 2-6). The flow through embodiments can be accomplished using a varying number of beds and pressure equalization steps. For example, flow through the evacuating bed can be accomplished with six beds and three pressure equalization steps (FIGS. 2-4). Alternatively, flow through the evacuating bed can be accomplished with five beds and two pressure equalization steps (FIG. 5) or seven beds and three pressure equalization steps (FIG. 6). At any time during any of these processes, the beds will be in one of the following categories of steps: feed, depressurizations, evacuation, pressure equalizations, and repressurization. In addition, a purge step can be included in the cycle for the embodiment shown in FIG. 6.

Figure 8:
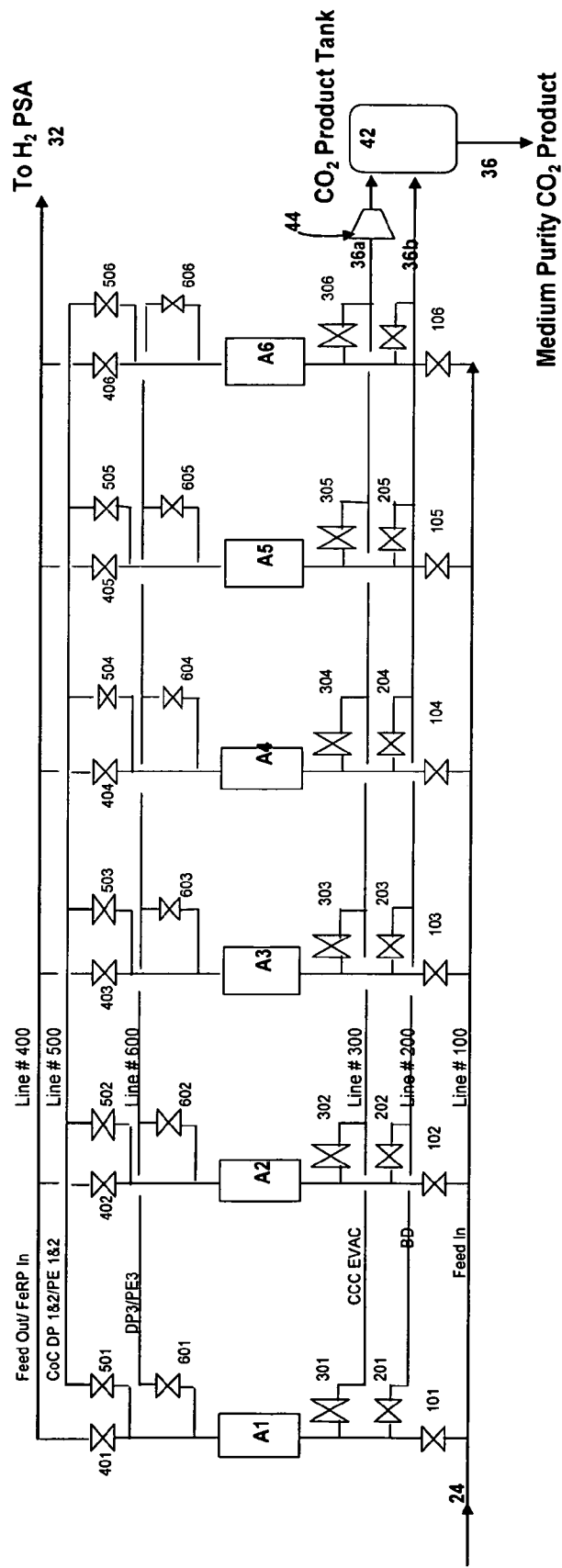
FIG. 8 shows a schematic drawing for $CO_2$ VPSA unit of FIG. 7.
Figure 9:
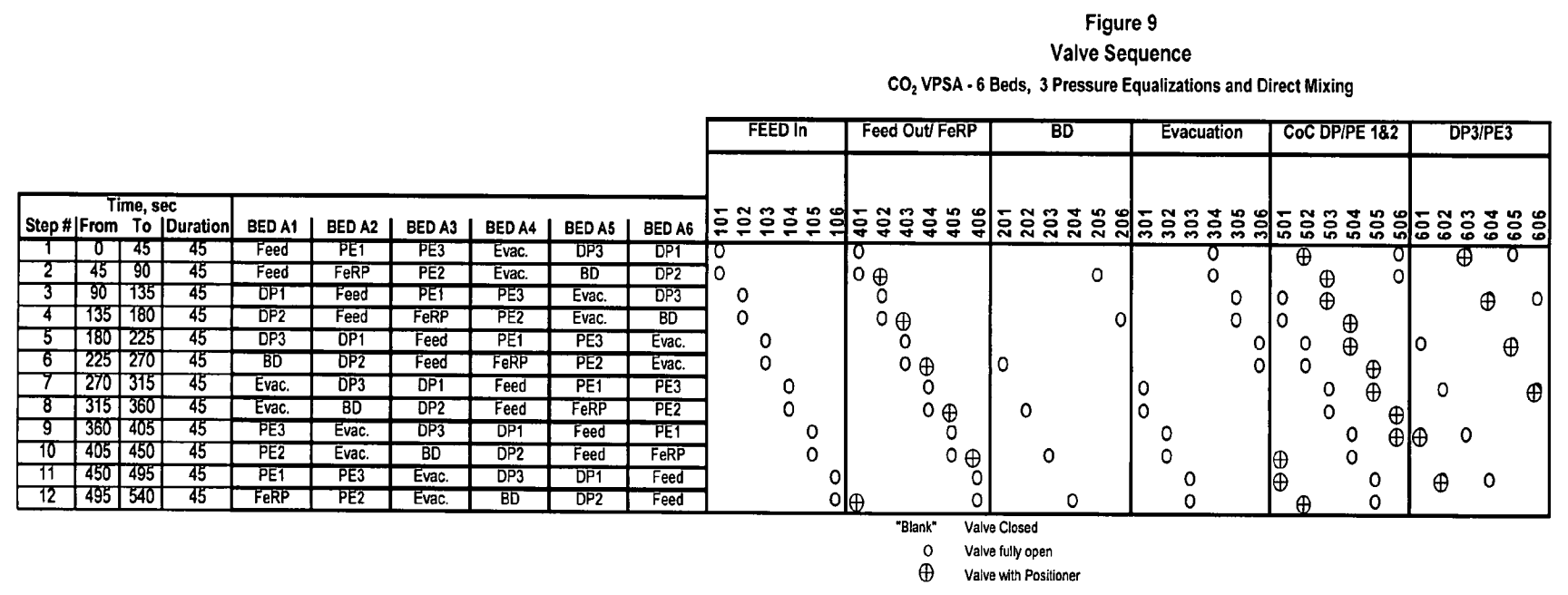

In other alternative embodiments of the present invention, the $CO_2$ VPSA processes and apparatus can be used to produce $CO_2$ having a purity of about 80 mole percent from a feed gas such as a syngas by direct mixing. In such embodiments, the $CO_2$ product produced during the final depressurization step (DPf) is not passed through another bed under evacuation. Rather, this stream is mixed directly with the stream from the evacuating bed. In one preferred and exemplary embodiment, this can be accomplished with a $CO_2$ VPSA unit having six beds and three pressure equalization steps (FIGS. 7-9). In other embodiments, this can be accomplished by using a $CO_2$ VPSA unit having five beds and two pressure equalization steps (FIG. 10). At any time during any of these processes, the beds will be in one of the following categories of steps: feed, depressurizations, evacuation, pressure equalizations, and repressurization.

Combinations of flow through and direct mixing can also be used. In such embodiments, a portion of the stream produced during the depressurization step (DPf) flows through the bed under evacuation and the remainder is directly mixed with the stream exiting the bed under evacuation.

In embodiments where increased plant capacity is desirable, the embodiments shown in FIGS. 11 and 12 can be utilized. More specifically, FIG. 11 shows a cycle step chart for an embodiment of the present invention in which two pressure equalizations and eight beds are used with direct mixing. In this embodiment, two beds are continuously on feed and at least two beds are continuously under evacuation. This arrangement is expected to allow for an increase in the capacity of the plant. FIG. 12 illustrates a cycle step chart for an embodiment of the present invention in which two pressure equalizations and eleven beds are used with direct mixing. In this embodiment, three beds are continuously on feed and two beds are continuously under evacuation. This arrangement is also expected to allow for an increase in the capacity of the plant. At any time during any of these processes, the beds will be in one of the following categories of steps: feed, depressurizations, evacuation, pressure equalizations, and repressurization.

In any of the embodiments, each bed is preferably packed with at least two layers of adsorbents. The type and sizing of the adsorbent layer toward the feed end (i.e. a water-selective adsorbent layer) in the bed is selected to remove moisture in the feed stream such that any residual moisture does not deteriorate the performance of the main (i.e., $CO_2$-selective) adsorbent layer. The water-selective adsorbent layer is also preferably capable of removing impurities (e.g., trace amounts of sulfur or heavy hydrocarbon compounds) from the feed stream, to the extent such impurities are present. The main, second adsorbent layer (i.e., the $CO_2$-selective adsorbent layer) is used for selectively adsorbing $CO_2$ from the feed stream after sufficient moisture has been removed.

For the first adsorbent layer (i.e. the water-selective adsorbent layer, adsorbents such as activated alumina, silica gel or zeolite molecular sieve are preferred. These adsorbents are intended to be illustrative and other adsorbents capable of removing sufficient moisture are also suitable for use in accordance with the present invention. Preferred characteristics for such adsorbent(s) include: high crush strength capabilities, high attrition resistance, large bulk density, low inter-particle void, high heat capacity, large thermal conductivity, low-pressure drop and stable in liquid water.

The main layer of adsorbent (i.e., the $CO_2$-selective adsorbent layer) following the water-selective adsorbent layer preferably has the following characteristics: high selectivity, high working capacity, fast kinetics and low heat of adsorption. Typical examples of such adsorbents include, but are not limited to: are NaY, HY, NaX, silica gel, and activated carbon. Other desired physical properties of the main layer adsorbent (i.e. the $CO_2$-selective layer) include: high crush strength, high attrition resistance, large bulk density, low inter-particle void, high heat capacity, large thermal conductivity and low-pressure drop during the feed and evacuation steps.

Those skilled in the art will appreciate that a composite mixed layer containing both adsorbents could be used in the present invention so long as the characteristics of the adsorbents are satisfied. Referring now to FIGS. 2-4, a first embodiment of the present invention having six beds (A1-A6) and using ten steps with flow through the evacuating bed to produce enriched $CO_2$ from syngas is illustrated. The process steps include:

1. Feed Step. A feed stream 24 (shown in FIG. 1) containing at least carbon dioxide and hydrogen gases at a high pressure between about 100-500 psia (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 2) or opposite (not shown in FIG. 2) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 2) or opposite (not shown in FIG. 2) as the feed flow.

4. Co-Current (CoC) Depressurization 3 (DP3). The $CO_2$ VPSA bed, which is now at some medium pressure (e.g., 60-300 psia), is further depressurized to a lower pressure (e.g., 50-200 psia) in a direction the same as (shown in FIG. 2) or opposite (not shown in FIG. 2) as the feed flow.

5. Final Depressurization (DPf). The $CO_2$ VPSA bed, which is now at a pressure lower than at the start of step 4 (about 50-200 psia) is further depressurized to a pressure close to ambient (about 20 psia) in a direction the same as (shown in FIG. 2) and/or the opposite (not shown in FIG. 2) the feed flow. As shown by the arrows in FIG. 2 (i.e. arrows from DPf to bed under evacuation), the stream from this step (DPf) flows through the bed under evacuation (e.g. in FIG. 2: bed 1 to bed 6, bed 2 to bed 1, bed 3 to bed 2, bed 4 to bed 3, bed 5 to bed 4 or bed 6 to bed 5 on the respective cycle steps).

6. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 2) or opposite (shown in FIG. 2) to the feed flow. As shown in FIG. 2 and outlined in the description of step 5 (DPf) above, this bed is receiving gas from another bed in the DPf step. The gas from the bed under evacuation constitutes the $CO_2$ product stream.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 2) or opposite (shown in FIG. 2) to the feed flow. This step increases $CO_2$ recovery by keeping the $CO_2$ from step 4 within the VPSA system. This minimizes $CO_2$ loss by eliminating the need to send the $CO_2$ to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 2) or opposite (shown in FIG. 2) to the feed flow. This step increases $CO_2$ recovery by keeping the $CO_2$ from step 3 within the VPSA system. This minimizes $CO_2$ loss by eliminating the need to send the $CO_2$ to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 2) or opposite (shown in FIG. 2) to the feed flow. This step further increases $CO_2$ recovery by keeping the $CO_2$ from step 2 within the VPSA system. This minimizes $CO_2$ loss by eliminating the need to send the $CO_2$ to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. The ten-step process described is for one cycle for one bed in the $CO_2$ VPSA unit. The above ten steps for this flow through the evacuating bed embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the $CO_2$ VPSA unit or to the $H_2$ PSA unit. Six adsorption beds are utilized in the embodiment described above to maintain the continuity of the key process steps.

Exemplary corresponding hardware and a flow schematic of the $CO_2$ VPSA process corresponding to the cycle shown FIG. 2 is depicted in FIG. 3. The various valves in FIG. 3 can be operated in the manner illustrated in FIG. 4 to carry out the ten steps in the six-bed process as described hereinabove. It should be appreciated that pressures and step durations shown are only for illustrative purposes. Those skilled in the art will appreciate that other combinations of pressures and step durations may be used.

As can be appreciated from the above description, the present invention thus relies upon depressurizations of at least one $CO_2$-selective adsorbent from high pressure to low pressure to increase $CO_2$ concentration in the bed. After $CO_2$ concentration is increased, it produces the $CO_2$ product by further pressure reduction. This became possible based on the recognition that for some adsorbents, pressure reduction from high to low pressure increases $CO_2$ concentration on the adsorbent.

In the embodiment shown in FIGS. 2-4 and as described, the gas produced during the final depressurization (step number 5, DPf) flows through the bed under evacuation as shown by the arrows in the cycle step chart in FIG. 2. By utilizing the final depressurization gas stream (step number 5) in this manner, there is minimal or no $H_2$ loss from the $CO_2$ VPSA unit.

Alternative and additional exemplary embodiments that utilize the final depressurization gas stream (DPf) flow through the evacuating bed are illustrated in FIGS. 5 and 6.

Referring now to FIG. 5, a cycle step chart for an eight-step process that utilizes five beds and two pressure equalization steps is shown. These cycle steps are carried out in a similar to those steps described above with reference to FIG. 2, except that steps DP3 and PE3 have been eliminated. More specifically, the cycle steps for FIG. 5 include the following:

1. Feed Step. A feed stream 24 (shown in FIG. 1) containing at least carbon dioxide and hydrogen gases at a high pressure between about 100-500 psia (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 5) or opposite (not shown in FIG. 5) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 5) or opposite (not shown in FIG. 5) as the feed flow.

4. Final Depressurization (DPf). The $CO_2$ VPSA bed, which is now at a pressure lower than at the start of step 4 (about 50-200 psia) is further depressurized to a pressure close to ambient (about 20 psia) in a direction the same as (shown in FIG. 5) and/or the opposite (not shown in FIG. 5) the feed flow. As shown by the arrows in FIG. 5 (i.e. arrows from DPf to bed under evacuation), the stream from this step (DPf) flows through the bed under evacuation (e.g. as shown in FIG. 5: bed 1 to bed 5, bed 2 to bed 1, bed 3 to bed 2, bed 4 to bed 3 or bed 5 to bed 4 on the respective cycle steps).

5. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 5) or opposite (shown in FIG. 5) to the feed flow. As shown in FIG. 5 and as outlined in the description of step 4 (DPf) above, this bed is receiving gas from another bed in the DPf step for the duration of the DPf step. The gas from the bed under evacuation constitutes the $CO_2$ product stream.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 5) or opposite (shown in FIG. 5) to the feed flow. This step increases $CO_2$ recovery by keeping the $CO_2$ from step 3 within the VPSA system. This minimizes $CO_2$ loss by eliminating the need to send the $CO_2$ to a waste stream.

7. Countercurrent Pressure (CcC) Equalization 1 (PE1). The bed pressure equalized in step 6 is further pressure equalized to a pressure range of the gas produced in step 1 (DP1) (i.e., to about 80-400 psia) in a direction the same as (not shown in FIG. 5) or opposite (shown in FIG. 5) to the feed flow. This step further increases $CO_2$ recovery by keeping the $CO_2$ from step 2 within the VPSA system. This minimizes $CO_2$ loss by eliminating the need to send the $CO_2$ to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. The eight-step process described is for one cycle for one bed in the $CO_2$ VPSA unit. The above eight steps for this flow through the evacuating bed embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the $CO_2$ VPSA unit or to the $H_2$ PSA unit. Five adsorption beds are utilized in the embodiment described above to maintain the continuity of the key process steps.

Referring now to FIG. 6, a cycle step chart for an eleven-step process that utilizes seven beds and three pressure equalization steps is shown. These cycle steps are carried out in a similar manner to those steps described above with reference to FIG. 2, except that an additional step (Rf) is included between the final depressurization step (DPf) and the evacuation step. More specifically, the cycle steps for FIG. 6 include the following:

1. Feed Step. A feed stream 24 (shown in FIG. 1) containing at least carbon dioxide and hydrogen gases at a high pressure between about 100-500 psia (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 6) or opposite (not shown in FIG. 6) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 6) or opposite (not shown in FIG. 6) as the feed flow.

4. Co-Current (CoC) Depressurization 3 (DP3). The $CO_2$ VPSA bed, which is now at some medium pressure (e.g., 60-300 psia), is further depressurized to a lower pressure (e.g., 50-200 psia) in a direction the same as (shown in FIG. 6) or opposite (not shown in FIG. 6) as the feed flow.

5. Final Depressurization (DPf). The $CO_2$ VPSA bed, which is now at a pressure lower than at the start of step 4 (about 50-200 psia) is further depressurized to a pressure close to ambient (about 20 psia) in a direction the same as (shown in FIG. 6) and/or the opposite (not shown in FIG. 6) the feed flow.

6. Receive Purge (Rf). The stream produced by DPf (e.g., bed 1 in FIG. 6) is fed to another bed having completed DPf, but not yet under evacuation (e.g., bed 7 in FIG. 6). During this time (duration of the Rf step), the effluent (e.g., bed 7 in FIG. 6) flows to tank 42 as $CO_2$ product. During the remaining time period of DPf of bed 1, the gas flows through the bed under evacuation (e.g., bed 7 in FIG. 6).

7. Evacuation. The $CO_2$ VPSA bed, which is now close to ambient pressure (about 20 psia), is evacuated to a predetermined low pressure, a subambient pressure (about 1-12 psia)

in a direction the same as (not shown in FIG. 6) or opposite (shown in FIG. 6) to the feed flow. As shown in FIG. 6, this bed (bed 1) is receiving gas from another bed in the DPf step (bed 2). The gas from the bed under evacuation constitutes at least part of the $CO_2$ product stream.

8. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 2) or opposite (shown in FIG. 2) to the feed flow. This step increases $CO_2$ recovery by keeping the $CO_2$ from step 4 within the VPSA system. This minimizes $CO_2$ loss by eliminating the need to send the $CO_2$ to a waste stream.

9. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 6) or opposite (shown in FIG. 6) to the feed flow. This step increases $CO_2$ recovery by keeping the $CO_2$ from step 3 within the VPSA system. This minimizes $CO_2$ loss by eliminating the need to send the $CO_2$ to a waste stream.

10. Countercurrent Pressure (CcC) Equalization 1 (PE1). The bed pressure equalized in step 9 is further pressure equalized to a pressure range of the gas produced in step 2 (DP1) (i.e., to about 80-400 psia) in a direction the same as (not shown in FIG. 6) or opposite (shown in FIG. 6) to the feed flow. This step further increases $CO_2$ recovery by keeping the $CO_2$ from step 2 within the VPSA system. This minimizes $CO_2$ loss by eliminating the need to send the $CO_2$ to a waste stream.

11. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. The eleven-step process described is for one cycle for one bed in the $CO_2$ VPSA unit.

The above eleven steps for this flow through the evacuating bed embodiment are carried out in a cyclic manner with the other beds in the unit such that feed-into and feed-effluent from step 1 are continuous. In addition, the evacuation step (number 7) is designed to be continuous. This ensures that the vacuum pump operates continuously, and that there is no break in feed-into the $CO_2$ VPSA unit or to the $H_2$ PSA unit. Seven adsorption beds are utilized in the embodiment described above to maintain the continuity of the key process steps.

As mentioned above, by flowing the gas produced during the final depressurization step (DPf) through a bed under evacuation and/or prior to its going to the evacuation step, all or substantially all the $H_2$ loss from the $CO_2$ VPSA unit can be eliminated (FIG. 2-6). In other embodiments (FIGS. 7-12), little or no $H_2$ loss may also be achieved by directly mixing the two streams (i.e. effluents from DPf and evacuation). Referring now to FIGS. 7-9, an embodiment of the present invention having six beds (A1-A6) and using ten steps with direct mixing of $CO_2$ gas from the DPf step and the evacuation step to produce a final $CO_2$-enriched gas from syngas is illustrated. The process steps include:

1. Feed Step. A feed stream 24 (shown in FIG. 1) containing at least carbon dioxide and hydrogen gases at a high pressure between about (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1). The $CO_2$ VPSA bed, which has finished the feed step is now at high feed pressure (e.g., 100-500 psia), is depressurized to a medium pressure (e.g., 80-400 psia) in a direction the same (shown in FIG. 7) or opposite (not shown in FIG. 7) as the feed flow.

3. Co-Current (CoC) Depressurization 2 (DP2). The $CO_2$ VPSA bed, which is now at some medium pressure (e.g., 80-400 psia), is further depressurized to a lower pressure (e.g., 60-300 psia) in a direction the same as (shown in FIG. 7) or opposite (not shown in FIG. 7) as the feed flow.

4. Co-Current (CoC) Depressurization 3 (DP3). The $CO_2$ VPSA bed, which is now at some medium pressure (e.g., 60-300 psia), is further depressurized to a lower pressure (e.g., 50-200 psia) in a direction the same as (shown in FIG. 7) or opposite (not shown in FIG. 7) as the feed flow.

5. Final Depressurization (DPf). The $CO_2$ VPSA bed, which is now at a pressure lower than at the start of step 4 (about 50-200 psia) is further depressurized to a pressure close to ambient (about 20 psia) in a direction the same as (not shown in FIG. 7) and/or the opposite (shown in FIG. 7) the feed flow to produce $CO_2$ product 36b shown in FIG. 8. This stream may constitute part of the $CO_2$ product (stream 36 in FIG. 8).

6. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 7) or opposite (shown in FIG. 7) to the feed flow. The gas from the bed under evacuation (stream 36a in FIG. 8) constitutes part of the $CO_2$ product stream (stream 36 in the Figures). Optionally, stream 36a can be further compressed using a blower (not shown) prior to passing to tank 42.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 7) or opposite (shown in FIG. 7) to the feed flow. This step increases $CO_2$ recovery by keeping the $CO_2$ from step 4 within the VPSA system. This minimizes $CO_2$ loss by eliminating the need to send the $CO_2$ to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 7) or opposite (shown in FIG. 7) to the feed flow. This step increases $CO_2$ recovery by keeping the $CO_2$ from step 3 within the VPSA system. This minimizes $CO_2$ loss by eliminating the need to send the $CO_2$ to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 7) or opposite (shown in FIG. 7) to the feed flow. This step further increases $CO_2$ recovery by keeping the $CO_2$ from step 2 within the VPSA system. This minimizes $CO_2$ loss by eliminating the need to send the $CO_2$ to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. As further shown in FIG. 7, $CO_2$ product 36 is formed of $CO_2$ from streams 36b (step 6) and 36a (step 7) by product tank 42. Product 36 is expected to have a $CO_2$ purity level of approximately 80 mole percent or greater.

The ten-step process described is for one cycle for one bed in the $CO_2$ VPSA unit. The above ten steps for this direct mixing embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the $CO_2$ VPSA unit or to the $H_2$ PSA unit. Six adsorption beds are utilized in the embodiment described above to maintain the continuity of the key process steps.

Exemplary corresponding hardware and a flow schematic of the $CO_2$ VPSA process corresponding to the cycle shown FIG. 7 is depicted in FIG. 8. The various valves in FIG. 8 can be operated in the manner illustrated in FIG. 9 to carry out the ten steps in the six-bed process as described hereinabove.

It should be appreciated that pressures and step durations shown are only for illustrative purposes. Those skilled in the art will appreciate that other combinations of pressures and steps may be used. In the embodiment shown in FIGS. 7-9 and as described, the gas produced during the final depressurization step (DPf) is mixed with the evacuated gas from step number 6. Consequently, there is minimal or no $H_2$ loss from the $CO_2$ VPSA unit.

Another exemplary embodiment that utilizes direct mixing of the final depressurization gas stream (DPf) with the gas produced by evacuation bed is illustrated in FIG. 10.

Referring now to FIG. 10, a cycle step chart for an eight-step process that utilizes five beds and two pressure equalization steps is shown. These cycle steps are carried out in a similar manner to those steps described above with reference to FIG. 7, except that steps DP3 and PE3 have been eliminated. More specifically, the cycle steps for FIG. 10 include the following:

1. Feed Step: A feed stream 24 (shown in FIG. 1) containing at least carbon dioxide and hydrogen gases at a high pressure between about 100-500 psia (for example, about 375 psia) and produced by the shift reactor 20 is diverted to the $CO_2$ VPSA unit of the present invention. High-pressure effluent 32 (i.e., a $H_2$-enriched stream) from the $CO_2$ VPSA unit (unit 30 in FIG. 1) is sent to the $H_2$ PSA unit 28, which in turn produces high-pressure, high purity hydrogen product (stream 38 in FIG. 1). After a predetermined time or after $CO_2$ breakthrough from the bed on the feed 24, the feed step is terminated.

2. Co-Current (CoC) Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 10) or opposite (not shown in FIG. 10) as the feed flow.

3. Co-Current (CoC) Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 10) or opposite (not shown in FIG. 10) as the feed flow.

4. Final Depressurization (DPf). The $CO_2$ VPSA bed, which is now at a pressure lower than at the start of step 4 (about 50-200 psia) is further depressurized to a pressure close to ambient (about 20 psia) in a direction the same as (not shown in FIG. 10) and/or the opposite (shown in FIG. 10) the feed flow to produce $CO_2$ product 36b. This stream may constitute part of the $CO_2$ product (stream 36).

5. Evacuation. The $CO_2$ VPSA bed, which is now close to ambient pressure (about 20 psia), is evacuated to a predetermined low pressure, a subambient pressure (about 1-12 psia) in a direction the same as (not shown in FIG. 10) or opposite (shown in FIG. 10) to the feed flow. The gas from the bed under evacuation (stream 36a in FIG. 8) constitutes part of the $CO_2$ product stream (stream 36 in the Figures). Optionally, stream 36a can be further compressed using a blower (not shown) prior to passing to tank 42.

6. Countercurrent (CcC) Pressure Equalization 2 (PE2): The evacuated bed is now pressure equalized to a pressure range of the gas produced in step 3 (DP2) (i.e., to about 60-300 psia) in a direction the same as (not shown in FIG. 10) or opposite (shown in FIG. 10) to the feed flow. This step increases $CO_2$ recovery by keeping the $CO_2$ from step 3 within the VPSA system. This minimizes $CO_2$ loss by eliminating the need to send the $CO_2$ to a waste stream.

7. Countercurrent Pressure (CcC) Equalization 1 (PE1): The bed pressure equalized in step 6 is further pressure equalized to a pressure range of the gas produced in step 2 (DP1) (i.e., to about 80-400 psia) in a direction the same as (not shown in FIG. 10) or opposite (shown in FIG. 10) to the feed flow. This step further increases $CO_2$ recovery by keeping the $CO_2$ from step 2 within the VPSA system. This minimizes $CO_2$ loss by eliminating the need to send the $CO_2$ to a waste stream.

8. Repressurization (FeRP): The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1. $CO_2$ product 36 is formed of $CO_2$ from streams 36b (step 4) and 36a (step 5) by product tank 42. Product 36 is expected to have a $CO_2$ purity level of approximately 80 mole percent or greater.

The eight-step process described is for one cycle for one bed in the $CO_2$ VPSA unit. The above eight steps for this direct mixing embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the $CO_2$ VPSA unit or to the $H_2$ PSA unit. Five adsorption beds are utilized in the embodiment described above to maintain the continuity of the key process steps.

It is also expected that the present invention can be modified to produce higher amounts of $CO_2$ and thus high plant capacity. For example, one may need or desire to process higher feed flow rates than may be handled by a single vacuum train or single vessel (due to fluidization or transportation limitations). In such situations, the process steps may be arranged such that at least two beds are on feed and at least two beds are under evacuation all the time. Such exemplary cycle step charts and arrangement are shown in FIGS. 11 and 12. Alternatively or in addition, multiple trains can be used.

EXAMPLE

The direct mixing process cycle shown in FIG. 7 was tested on a six-bed pilot unit and is expected to readily scale up. The inner diameter (ID) of the column was 2.17 inch and the packed bed height was 130 inches. The column was packed with 1.3 lb of commercially available activated alumina, 10.2 lb of commercially available 1/16" NaY pellets and the top void was filled with 3" of ceramic balls. The feed contained 2.8% CO, 15.7% $CO_2$, 6.3% $CH_4$ and 0.2% $N_2$ with balance being $H_2$. The feed was at 375 psia. The process was run in a cyclic manner until it reached cyclic steady state. The final depressurization step (DPf) was from about 70 to about 20 psia. This was followed by evacuation to approximately 4 psia. $CO_2$ recovery was approximately 86% at a purity of about 83%.

The processes described above may be operated at feed pressures higher than 100 psia, and more preferably greater than 300 psia (for example, about 375 psia). $CO_2$ in the feed gas should preferably be higher than 10 mole percent, and most preferably greater than 15 mole percent (e.g., 15-25 mole percent). Feed temperature may be between about 40-200° F., more preferably between about 60-150° F., and most preferably about 100° F.

In alternative embodiments of the present invention, storage tanks may be added in place of some of the adsorbent beds in the process cycle to store some of the intermediate gas streams such as the depressurized gas. The purpose of these storage tanks is to maintain flow into and out of the $CO_2$ VPSA unit as continuous.

The present invention thus provides processes and apparatus for the recovery of medium purity (e.g., approximately ≧80 mole %) carbon dioxide from syngas. In accordance with preferred embodiments of the present invention, there is constant feed, constant product being produced and rotating machinery is preferably run continuously so as to eliminate unnecessary tank(s). If, however, there are reasons for limiting the number of adsorbent beds (e.g. high cost of the adsorbent) storage tanks instead of the adsorbent vessels may be used as explained above. While every bed the same cycle, the number of beds is to be minimized taking these factors into consideration.

The feed to the $CO_2$ VPSA unit can be at super ambient pressure, and the $CO_2$ product can be produced as described above. When the $CO_2$ VPSA unit is installed upstream of a $H_2$ PSA unit, hydrogen recovery is expected to increase by extracting the $CO_2$, thereby increasing hydrogen partial pressure in the $H_2$ PSA feed stream. The recovered $CO_2$ can be used as produced or further upgraded such as shown in commonly owned U.S. patent application Ser. No. _____, filed on even date herewith and entitled "Carbon Dioxide Production Method" by Shah et al., the entire contents of which are incorporated herein by reference. The recovered $CO_2$ can then be used, sequestered or used in applications such as enhanced oil recovery (EOR).

It will be appreciated by those skilled in the art that the present invention is not limited to embodiments where the $CO_2$ VPSA unit is placed downstream of an SMR/shift reactor and upstream of a $H_2$ PSA unit. The present invention can also be used, for example, with a partial oxidation reactor together with any feed stream as defined hereinabove.

It will also be appreciated that in some cases, the pressure equalization steps could be eliminated. In such cases, the gas that was not pressure equalized can be fed to the product stream. Consequently, $CO_2$ purity may be reduced. This may reduce hydrogen and/or carbon dioxide recovery since more hydrogen and/or carbon dioxide could be present in stream 36. In such cases, the number of beds may be reduced. It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A vacuum pressure swing adsorption (VPSA) process for the recovery of carbon dioxide from a multi-component gas mixture containing at least carbon dioxide and hydrogen in a VPSA unit containing at least one adsorption bed containing at least one $CO_2$-selective adsorbent, the process comprising:
   feeding the multi-component gas mixture containing the at least carbon dioxide and the hydrogen to the at least one adsorption bed at a first pressure within a first pressure range for a predetermined time to produce a hydrogen-enriched stream;
   depressurizing the at least one adsorption bed in a first depressurization step from the first pressure to a second pressure within a second pressure range in a same direction as or an opposite direction as the feed flow;
   depressurizing the at least one adsorption bed in a second depressurization step from the second pressure to a third pressure within a third pressure range in a same direction as or an opposite direction as the feed flow;
   depressurizing the at least one adsorption bed in a third depressurization step from the third pressure to a fourth pressure within a fourth pressure range in a same direction as or an opposite direction as the feed flow;
   depressurizing the at least one adsorption bed in a final depressurization step from the fourth pressure to a pressure range close to ambient in a same direction as the feed flow or in a direction opposite the feed flow to produce at least a first portion of $CO_2$ product;
   evacuating the at least one adsorption bed from the pressure close to ambient to a pressure at or below ambient in a direction opposite the feed flow to produce at least a second portion of $CO_2$ product and during the evacuating step, the at least one adsorption bed receiving at least a portion of the first portion of $CO_2$ product;
   pressure equalizing the at least one adsorption bed in a first pressure equalization step in a direction opposite the feed flow;
   further pressure equalizing the at least one adsorption bed in a second pressure equalization step in a direction opposite the feed flow;
   further pressure equalizing the at least one adsorption bed in a third pressure equalization step in a direction opposite the feed flow; and
   repressurizing the at least one adsorption bed in a repressurization step to the first pressure range;
   wherein the process is repeated cyclically.

2. The process of claim 1, wherein the number of adsorption beds comprises six beds.

3. The process of claim 1, wherein the first pressure range is between about 100-500 psia.

4. The process of claim 2 wherein the adsorption beds are in a single train configuration.

5. The process of claim 1, wherein the second pressure range is between about 80-400 psia.

6. The process of claim 1, wherein the third pressure range is between about 60-300 psia.

7. The process of claim 1, wherein the fourth pressure range is between about 50-200 psia.

8. The process of claim 1, wherein the first depressurization step is in a direction the same as the direction of the feed flow.

9. The process of claim 1, wherein the first depressurization step is in an opposite direction as the direction of the feed flow.

10. The process of claim 1, wherein the second depressurization step is in a direction the same as the direction of the feed flow.

11. The process of claim 1, wherein the second depressurization step is in an opposite direction as the direction of the feed flow.

12. The process of claim 1, wherein the third depressurization step is in a direction the same as the direction of the feed flow.

13. The process of claim 1, wherein the third depressurization step is in an opposite direction as the direction of the feed flow.

14. The process of claim 1, wherein the fourth depressurization step is in a direction the same as the direction of the feed flow.

15. The process of claim 1, wherein the fourth depressurization step is in an opposite direction as the direction of the feed flow.

16. The process of claim 1, wherein the pressure range for the pressure close to ambient is about 20 psia.

17. The process of claim 1, wherein the pressure range for the pressure below ambient is 1-12 psia.

18. The process of claim 1, wherein hydrogen-enriched stream is fed to a hydrogen recovery unit.

19. The process of claim 18, wherein the hydrogen recovery unit is a hydrogen pressure swing adsorption (PSA) unit.

20. The process of claim 1, wherein the third pressure equalization step increase $CO_2$ recovery.

21. The process of claim 1, wherein the at least first and at least second portions of the $CO_2$ product are combined to form a final $CO_2$ product.

22. The process of claim 1, wherein each at least one bed contains a water-selective adsorbent and a $CO_2$-selective adsorbent.

23. The process of claim 22, wherein the water-selective adsorbent is selected from the group comprising: activated alumina, silica gel, zeolite molecular sieve and combinations thereof.

24. The process of claim 22, wherein the $CO_2$-selective adsorbent is selected from the group comprising: NaY, HY, NaX, silica gel, activated carbon and combinations thereof.

25. A vacuum pressure swing adsorption (VPSA) process for the recovery of carbon dioxide from a multi-component gas mixture containing at least carbon dioxide and hydrogen in a VPSA unit containing at least one adsorption bed containing at least one $CO_2$-selective adsorbent, the process comprising:
feeding the multi-component gas mixture containing the at least carbon dioxide and the hydrogen to the at least one adsorption bed at a first pressure within a first pressure range for a predetermined time to produce a hydrogen-enriched stream;
depressurizing the at least one adsorption bed in a first depressurization step from the first pressure to a second pressure within a second pressure range in a same direction as or an opposite direction as the feed flow;
depressurizing the at least one adsorption bed in a second depressurization step from the second pressure to a third pressure within a third pressure range in a same direction as or an opposite direction as the feed flow;
depressurizing the at least one adsorption bed in a final depressurization step from the third pressure to a pressure range close to ambient in a same direction as the feed flow or in a direction opposite the feed flow to produce at least a first portion of $CO_2$ product;
evacuating the at least one adsorption bed from the pressure close to ambient to a pressure at or below ambient in a direction opposite the feed flow to produce at least a second portion of $CO_2$ product and during the evacuating step, the at least one adsorption bed receiving at least a portion of the first portion of CO2 product;
pressure equalizing the at least one adsorption bed in a first pressure equalization step in a direction opposite the feed flow;
further pressure equalizing the at least one adsorption bed in a second pressure equalization step in a direction opposite the feed flow; and
repressurizing the at least one adsorption bed in a repressurization (RP) step to the first pressure range;
wherein the process is repeated cyclically.

26. The process of claim 25, wherein the number of adsorption beds comprises five beds.

27. The process of claim 25, wherein the first pressure range is between about 100-500 psia.

28. The process of claim 26, wherein the adsorption beds are in a single train configuration.

29. The process of claim 25, wherein the second pressure range is between about 80-400 psia.

30. The process of claim 25, wherein the third pressure range is between about 60-300 psia.

31. The process of claim 25, wherein the first depressurization step is in a direction the same as the direction of the feed flow.

32. The process of claim 25, wherein the first depressurization step is in an opposite direction as the direction of the feed flow.

33. The process of claim 25, wherein the second depressurization step is in a direction the same as the direction of the feed flow.

34. The process of claim 25, wherein the second depressurization step is in an opposite direction as the direction of the feed flow.

35. The process of claim 25, wherein the third depressurization step is in a direction the same as the direction of the feed flow.

36. The process of claim 25, wherein the third depressurization step is in an opposite direction as the direction of the feed flow.

37. The process of claim 25, wherein the pressure range for the pressure close to ambient is about 20 psia.

38. The process of claim 25, wherein the pressure range for the pressure below ambient is 1-12 psia.

39. The process of claim 25, wherein the hydrogen-enriched stream is fed to a hydrogen recovery unit.

40. The process of claim 39, wherein the hydrogen recovery unit is a hydrogen pressure swing adsorption (PSA) unit.

41. The process of claim 25, wherein the at least first and at least second portions of the $CO_2$ product are combined to form a final $CO_2$ product.

42. The process of claim 25, wherein each at least one bed contains a water-selective adsorbent and a $CO_2$-selective adsorbent.

43. The process of claim 42, wherein the water-selective adsorbent is selected from the group comprising: activated alumina, silica gel, zeolite molecular sieve and combinations thereof.

44. The process of claim 42, wherein the $CO_2$-selective adsorbent is selected from the group comprising: NaY, HY, NaX, silica gel, activated carbon and combinations thereof.

45. A vacuum pressure swing adsorption (VPSA) process for the recovery of carbon dioxide from a multi-component gas mixture containing at least carbon dioxide and hydrogen in a VPSA unit containing at least one adsorption bed containing at least one $CO_2$-selective adsorbent, the process comprising:
feeding the multi-component gas mixture containing the at least carbon dioxide and the hydrogen to the at least one adsorption bed at a first pressure within a first pressure range for a predetermined time to produce a hydrogen-enriched stream;

depressurizing the at least one adsorption bed in a first depressurization step from the first pressure to a second pressure within a second pressure range in a same direction as or an opposite direction as the feed flow;

depressurizing the at least one adsorption bed in a second depressurization step from the second pressure to a third pressure within a third pressure range in a same direction as or an opposite direction as the feed flow;

depressurizing the at least one adsorption bed in a third depressurization step from the third pressure to a fourth pressure within a fourth pressure range in a same direction as or an opposite direction as the feed flow;

depressurizing the at least one adsorption bed in a final depressurization step from the fourth pressure range to a pressure range close to ambient in a same direction as the feed flow or in a direction opposite the feed flow to produce at least a first portion of $CO_2$ product;

evacuating the at least one adsorption bed from the pressure close to ambient to a pressure at or below ambient in a direction opposite the feed flow to produce at least a second portion of $CO_2$ product;

pressure equalizing the at least one adsorption bed in a first pressure equalization step in a direction opposite the feed flow;

further pressure equalizing the at least one adsorption bed in a second pressure equalization step in a direction opposite the feed flow;

further pressure equalizing the at least one adsorption bed in a third pressure equalization step in a direction opposite the feed flow; and repressurizing the at least one adsorption bed in a repressurization step to the first pressure range;

wherein the process is repeated cyclically.

46. The process of claim 45, wherein the number of adsorption beds comprises six beds.

47. The process of claim 45, wherein the first pressure range is between about 100-500 psia.

48. The process of claim 46, wherein the adsorption beds are in a single train configuration.

49. The process of claim 45, wherein the second pressure range is between about 80-400 psia.

50. The process of claim 45, wherein the third pressure range is between about 60-300 psia.

51. The process of claim 45, wherein the fourth pressure range is between about 50-200 psia.

52. The process of claim 45, wherein the first depressurization step is in a direction the same as the direction of the feed flow.

53. The process of claim 45, wherein the first depressurization step is in an opposite direction as the direction of the feed flow.

54. The process of claim 45, wherein the second depressurization step is in a direction the same as the direction of the feed flow.

55. The process of claim 45, wherein the second depressurization step is in an opposite direction as the direction of the feed flow.

56. The process of claim 45, wherein the third depressurization step is in a direction the same as the direction of the feed flow.

57. The process of claim 45, wherein the third depressurization step is in an opposite direction as the direction of the feed flow.

58. The process of claim 45, wherein the fourth depressurization step is in a direction the same as the direction of the feed flow.

59. The process of claim 45, wherein the fourth depressurization step is in an opposite direction as the direction of the feed flow.

60. The process of claim 45, wherein the pressure range for the pressure close to ambient is about 20 psia.

61. The process of claim 45, wherein the pressure range for the pressure below ambient is about 1-12 psia.

62. The process of claim 45, wherein the hydrogen-enriched stream is fed to a hydrogen recovery unit.

63. The process of claim 62, wherein the hydrogen recovery unit is a hydrogen pressure swing adsorption (PSA) unit.

64. The process of claim 45, wherein the first pressure equalization step increase $CO_2$ recovery.

65. The process of claim 45, wherein the second pressure equalization step increase $CO_2$ recovery.

66. The process of claim 45, wherein the fourth pressure equalization step increase $CO_2$ recovery.

67. The process of claim 45, wherein the at least first and at least second portions of the $CO_2$ product are combined to form a final $CO_2$ product.

68. The process of claim 45, wherein each at least one bed contains a water-selective adsorbent and a $CO_2$-selective adsorbent.

69. The process of claim 68, wherein the water-selective adsorbent is selected from the group comprising: activated alumina, silica gel, zeolite molecular sieve and combinations thereof.

70. The process of claim 68, wherein the $CO_2$-selective adsorbent is selected from the group comprising: NaY, MY, NaX, silica gel, activated carbon and combinations thereof.

71. A vacuum pressure swing adsorption (VPSA) process for the recovery of carbon dioxide from a multi-component gas mixture containing at least carbon dioxide and hydrogen in a VPSA unit containing at least one adsorption bed containing at least one $CO_2$-selective adsorbent, the process comprising:

feeding the multi-component gas mixture containing the at least carbon dioxide and the hydrogen to the at least one adsorption bed at a first pressure within a first pressure range for a predetermined time to produce a hydrogen-enriched stream;

depressurizing the at least one adsorption bed in a first depressurization step from the first pressure to a second pressure within a second pressure range in a same direction as or an opposite direction as the feed flow;

depressurizing the at least one adsorption bed in a second depressurization step from the second pressure to a third pressure within a third pressure range in a same direction as or an opposite direction as the feed flow;

depressurizing the at least one adsorption bed in a final depressurization step from the third pressure to a pressure range close to ambient in a same direction as the feed flow or in a direction opposite the feed flow to produce at least a first portion of $CO_2$ product;

evacuating the at least one adsorption bed from the pressure close to ambient to a pressure at or below ambient in a direction opposite the feed flow to produce at least a second portion of $CO_2$ product;

pressure equalizing the at least one adsorption bed in a first pressure equalization step in a direction opposite the feed flow;

further pressure equalizing the at least one adsorption bed in a second pressure equalization step in a direction opposite the feed flow; and repressurizing the at least one adsorption bed in a repressurization step to the first pressure range;
wherein the process is repeated cyclically.

72. The process of claim 71, wherein the number of adsorption beds comprises five beds.

73. The process of claim 71, wherein the first pressure range is between about 100-500 psia.

74. The process of claim 72, wherein the adsorption beds are in a single train configuration.

75. The process of claim 71, wherein the second pressure range is between about 80-400 psia.

76. The process of claim 71, wherein the third pressure range is between about 60-300 psia.

77. The process of claim 71, wherein the first depressurization step is in a direction the same as the direction of the feed flow.

78. The process of claim 71, wherein the first depressurization step is in an opposite direction as the direction of the feed flow.

79. The process of claim 71, wherein the second depressurization step is in a direction the same as the direction of the feed flow.

80. The process of claim 71, wherein the second depressurization step is in an opposite direction as the direction of the feed flow.

81. The process of claim 71, wherein the third depressurization step is in a direction the same as the direction of the feed flow.

82. The process of claim 71, wherein the third depressurization step is in an opposite direction as the direction of the feed flow.

83. The process of claim 71, wherein the pressure range for the pressure close to ambient is about 20 psia.

84. The process of claim 71, wherein the pressure range for the pressure below ambient is 1-12 psia.

85. The process of claim 71, wherein the hydrogen-enriched stream is fed to a hydrogen recovery unit.

86. The process of claim 71, wherein the hydrogen recovery unit is a hydrogen pressure swing adsorption (PSA) unit.

87. The process of claim 71, wherein the at least first and at least second portions of the $CO_2$ product are combined to form a final $CO_2$ product.

88. The process of claim 71, wherein each at least one bed contains a water-selective adsorbent and a $CO_2$-selective adsorbent.

89. The process of claim 88, wherein the water-selective adsorbent is selected from the group comprising: activated alumina, silica gel, zeolite molecular sieve and combinations thereof.

90. The process of claim 88, wherein the $CO_2$-selective adsorbent is selected from the group comprising: NaY, HY, NaX, silica gel, activated carbon and combinations thereof.

91. A vacuum pressure swing adsorption (VPSA) process for the recovery of carbon dioxide from a multi-component gas mixture containing at least carbon dioxide and hydrogen in a VPSA unit containing at least two adsorption beds in a single train configuration, each bed containing at least one $CO_2$-selective adsorbent, the process comprising:
cyclically maintaining the at least two beds in a step selected from the group comprising: a feed step, a depressurization step, an evacuation step, a pressure equalization step and a repressurization step;
wherein a hydrogen-enriched stream is produced and a final $CO_2$ product is produced from at least one $CO_2$ product stream; and
wherein the final $CO_2$ product is at a purity of approximately $\geq 80$ mole% $CO_2$.

92. The process of claim 91, wherein the number of adsorption beds comprises five beds.

93. The process of claim 91, wherein the number of adsorption beds comprises six beds.

94. The process of claim 91, wherein the number of adsorption beds comprises seven beds.

95. The process of claim 69, wherein the number of adsorption beds comprises eight beds.

96. The process of claim 91, wherein the number of adsorption beds comprises eleven beds.

97. The process of claim 91, wherein each bed contains a water-selective adsorbent and a $CO_2$-selective adsorbent.

98. The process of claim 97, wherein the water-selective adsorbent is selected from the group comprising: activated alumina, silica gel, zeolite molecular sieve and combinations thereof.

99. The process of claim 97, wherein the $CO_2$-selective adsorbent is selected from the group comprising: NaY, HY, NaX, silica gel, activated carbon and combinations thereof.

100. The process of claim 91, wherein the hydrogen-enriched stream is fed to a hydrogen recovery unit.

101. The process of claim 100, wherein the hydrogen recovery unit is a hydrogen pressure swing adsorption (PSA) unit.

* * * * *